United States Patent [19]

Boggs et al.

[11] Patent Number: 4,482,193
[45] Date of Patent: Nov. 13, 1984

[54] ROADABLE TRACK ASSEMBLY

[75] Inventors: Roger L. Boggs; Andrew J. Tonsor, both of East Peoria, Ill.

[73] Assignee: Caterpillar Tractor Co., Peoria, Ill.

[21] Appl. No.: 483,963

[22] Filed: Apr. 11, 1983

[51] Int. Cl.³ .............................................. B62D 55/28
[52] U.S. Cl. ................................... 305/51; 305/35 R; 305/54
[58] Field of Search .............................. 474/152–156; 305/11, 35 R, 39, 51, 54, 55, 46, 35 EB, 3 RR

[56] References Cited

U.S. PATENT DOCUMENTS

| | | | |
|---|---|---|---|
| 2,113,504 | 4/1938 | Caute | 305/53 |
| 2,903,303 | 9/1959 | Weller | 305/54 |
| 2,964,361 | 12/1960 | Hansen | 305/53 X |
| 3,830,551 | 8/1974 | Masaoka et al. | 305/35 EB X |
| 3,912,338 | 10/1975 | Toews | 305/54 |
| 4,359,248 | 11/1982 | Kortering | 305/46 |

FOREIGN PATENT DOCUMENTS 52-02923 1/1977 Japan .............................. 305/35 EB
718364 11/1954 United Kingdom .................. 305/53

*Primary Examiner*—David A. Scherbel
*Attorney, Agent, or Firm*—Claude F. White

[57] ABSTRACT

A roadable track assembly (12) includes a plurality of track shoes (14) having a roadable grouser (20) bar attached to each shoe (14). The grouser bar (20) is of a size, shape, and material to provide good penetration and traction in most soils and also provides acceptable wear life. A vehicle (10) equipped with an endless track assembly (12) having the subject grouser bars (20) can travel on asphalt type roadways without causing permanent damage to the roads. Track-type vehicles having conventional metal track shoe grousers often cause permanent damage when traveling upon asphalt roads. The subject roadable track shoe grousers (20) have sufficient surface area and resilience to produce low ground pressure on the roads and eliminate damage while providing sufficient traction for agricultural work.

13 Claims, 6 Drawing Figures

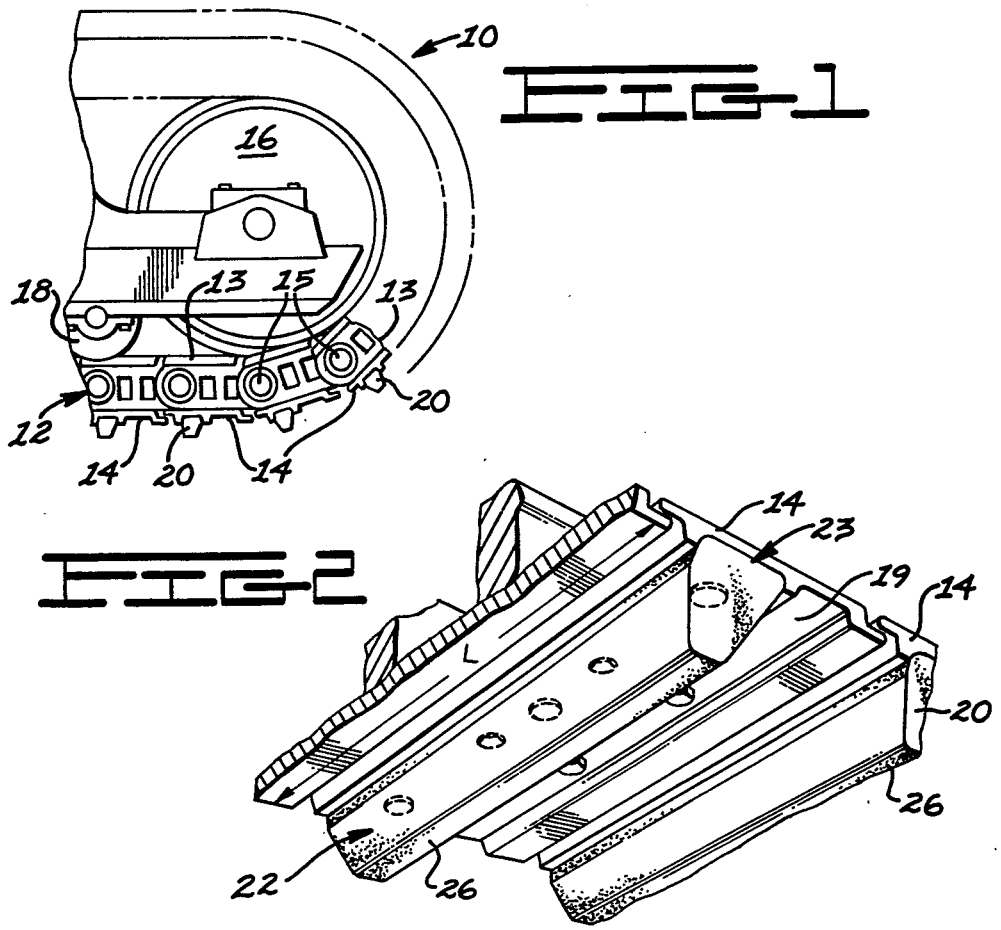
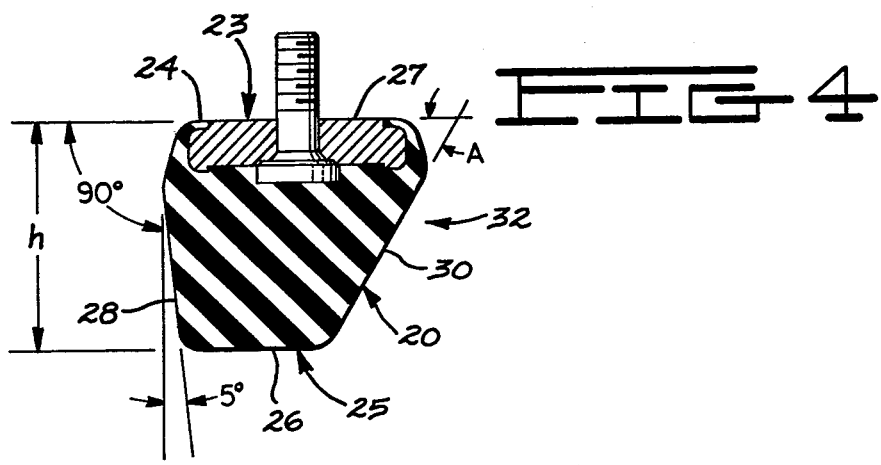

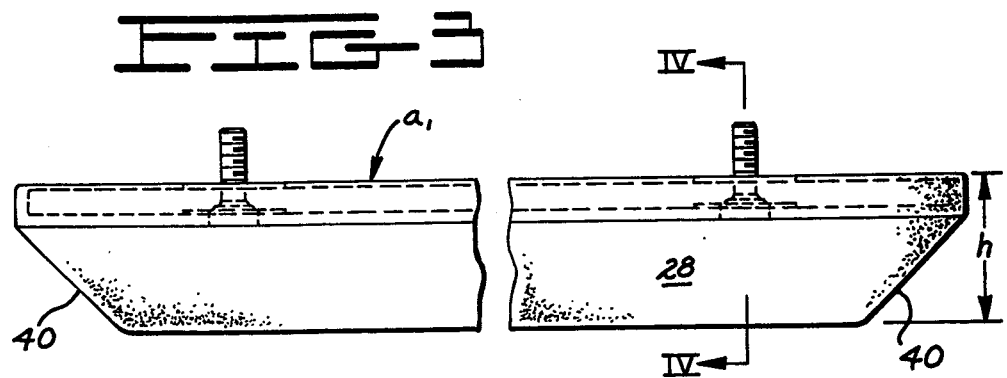
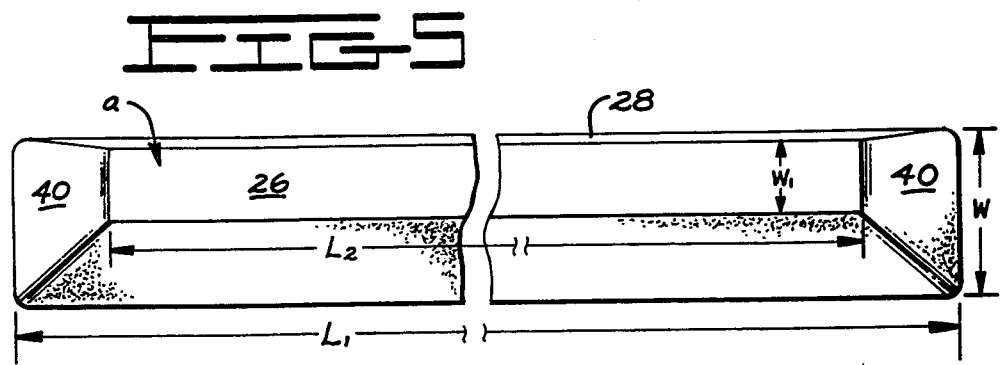
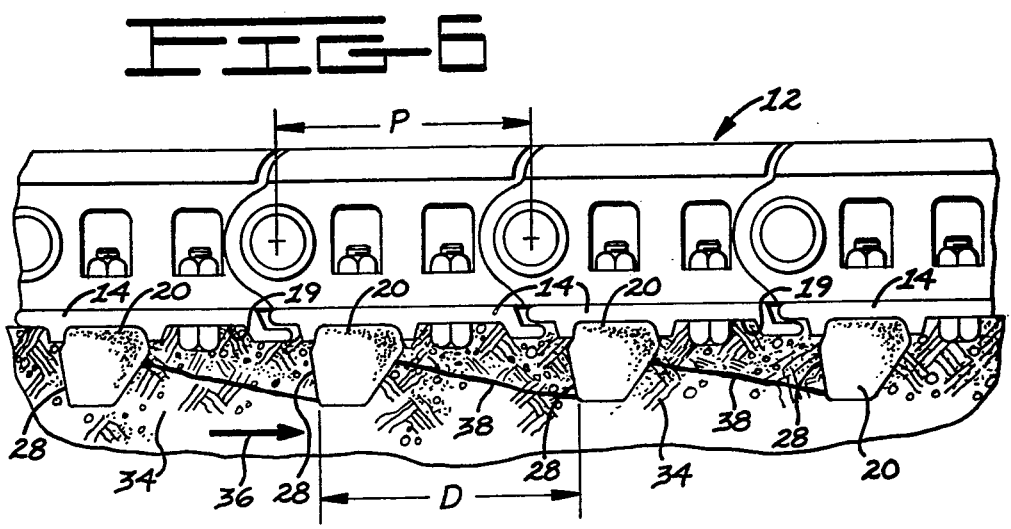

ROADABLE TRACK ASSEMBLY

DESCRIPTION

1. Technical Field

This invention relates generally to endless track assemblies and, more particularly, to a track assembly having a plurality of roadable grousers which provide good tractive penetration in soils but will not cause permanent damage to asphalt or other finished road surfaces.

2. Background Art

Track-type vehicles, such as tracked dozers and loaders, are driven by endless track chains equipped with steel track shoes. Traction is provided by outwardly extending projections or grousers on the shoes. However, maneuvering heavy, track-type vehicles over finished road surfaces, such as blacktop, can cause severe abrasion of or damage to these road surfaces, especially when the vehicle is turned.

In order to permit the operation of tracked vehicles on paved roads, it has been the practice of vehicle operators to mount road pads, such as those disclosed in U.S. Pat. No. 4,027,925 issued June 7, 1977 to Chester A. Black et al., on the track shoes of the vehicle. The road pads are secured to the track shoes by bolts or other fasteners such that the pads, rather than the grousers, contact the pavement. The use of pads provides sufficient traction on hard-surfaced roads to permit movement while protecting the road surfaces from the grousers. Unfortunately, these pads do not provide satisfactory traction in the field and must be removed from the shoes to expose the grousers. This mounting and unmounting of the pads is tedious and time-consuming and becomes a serious waste of time and effort when the vehicle must be operated alternately over hard-surfaced roads and undeveloped land, as for example in agricultural applications.

Alternately, relatively flat track shoes have been used for some time as a compromise between track shoes with conventional grouser configurations and removable pads. By way of example, the flat track shoe with tapered ribs disclosed in U.S. Pat. No. 3,847,451 issued Nov. 12, 1974 to Allan L. Freedy et al. and assigned to the assignee of the instant invention, is a track shoe which will result in minimal damage to hard surfaces. However, these shoes do not generally provide the necessary traction in agricultural type soils, owing to the absence of transversely extending grousers.

The apparatus disclosed in U.S. Pat. No. 3,542,439 issued Nov. 24, 1970 to Henry A. Joos addresses the aforementioned problems by providing a resilient, inflatable pad which is adapted for mounting on a grousered track shoe. The pad is convertible between a pad-exposed mode for operation over paved surfaces and a grouser-exposed mode for operation in undeveloped terrain. However, this apparatus may fail to prevent road damage if the pad is improperly inflated or looses air due to a leak.

U.S. Pat. No. 3,261,646 issued July 19, 1966 to J. H. Pax and U.S. Pat. No. 4,262,972 issued Apr. 21, 1981 to A. B. Falk disclose resilient pads for use on crawler tracks of endless track vehicles, such as military tank vehicles. These patents are typical of resilient type pads which have been used in the past on such military vehicles. However, these pads are "flat", as opposed to the subject invention which relates to a track assembly having "grousers".

Grousered tracks and flat tracks are generally employed in quite different fields of art. Flat tracks are used on vehicles where the primary function of the track is to merely propel the vehicle. However, grousered tracks are used on earthmoving vehicles which are typically equipped with bulldozer blades, rippers, and farm implements, such as plows. Whereas vehicles equipped with flat shoes or pads drive solely by means of frictional contact with the ground, grousered track shoes penetrate the ground with the grouser and present a vertical face to the ground. This vertical face reacts or pushes against the soil to provide the tractive effort. The subject roadable track assembly provides the advantageous features of both "flat" pads and "grousered" track shoes.

The present invention is directed to overcoming one or more of the problems as set forth above.

DISCLOSURE OF THE INVENTION

In one aspect of the present invention, an endless roadable track assembly for a vehicle has a plurality of interconnected track shoes, with each shoe having an outwardly extending roadable grouser bar of elastomeric material. The grouser bar has a preselected configuration and specific dimensions for providing full penetration and traction in most agricultural soils, while providing sufficient support for the vehicle to travel on, or across, asphalt or other finished type road surfaces without causing permanent damage to the roads.

Track-type tractors are often preferred over wheel type tractors for certain types of agricultural uses and in certain types of soils. However, in many areas, restrictions may limit the travel of machines having metal lugs or cleats along or across rural asphalt type roads owing to possible damage caused by the material and shape of the cleats. The subject invention provides a solution to the problems of road damage by utilizing a roadable track assembly having a roadable grouser attached to each shoe of the track assembly.

BRIEF DESCRIPTION OF THE DRAWINGS

FIG. 1 is a diagrammatic side elevational view of a portion of a track-type vehicle having an endless roadable track assembly embodying the present invention;

FIG. 2 is a diagrammatic perspective view of a portion of the track assembly of FIG. 1;

FIG. 3 is a diagrammatic front elevational view of one of the grouser bars of the present invention;

FIG. 4 is an enlarged diagrammatic view, in section, of one of the grouser bars of the present invention, taken generally along the line IV—IV of FIG. 3;

FIG. 5 is a diagrammatic bottom view of one of the grouser bars of the present invention; and, FIG. 6 is an enlarged side elevational view of a portion of an endless roadable track assembly embodying the present invention.

BEST MODE FOR CARRYING OUT THE INVENTION

Referring to the drawings, a track-type vehicle 10 includes an endless roadable track assembly 12 having a plurality of track links 13 coupled together by track pins 15. A track shoe 14 is removably secured to each track link 13. The track assembly 12 is driven by a powered sprocket wheel (not shown) and is guided and supported by an idler wheel 16 and a plurality of track rollers, one of which is shown at 18. The vehicle 10 is actually supported and driven by a pair of the track assemblies 12, one on each side of the vehicle 10. Since the track assemblies 12 are essentially identical, only one is shown and described. The vehicle 10 has a predetermined weight, and a predetermined portion of the track assembly 12 is in contact with the ground at any given time.

Each track shoe 14 has a length "L", a ground contacting surface 19, and a roadable grouser bar 20 secured to the shoe 14. The grouser bar 20 is preferably an elongated body 22 of elastomeric material, preferably rubber or urethane, and is bonded to a mounting bar 27 which is bolted or otherwise releasably fastened to the ground contacting surface 19 of the track shoe 14. A typical method and apparatus for securing the grouser bar 20 and mounting bar 27 to the track shoes 14 is disclosed in U.S. Pat. No. 4,359,248 issued on Nov. 16, 1982 to R. L. Kortering and assigned to the assignee of the present invention.

The elastomeric material of the grouser bar 20 preferably has a Durometer hardness rating in the range of about 60 to 75 on the Shore "A" scale. Below about 60 Shore "A", the elastomeric material becomes too soft so that it bulges under load which hinders its ability to penetrate fully into the soil or adequately support the vehicle loads. Also, the softer material does not provide sufficient abrasion resistance. Above about 75 Shore "A", the material becomes too hard and stiff so that it will not deflect properly to prevent damage to the road surfaces when the grouser bar 20 encounters a rock or other hard obstacle on the road surface. A high hardness also promotes cracking and splitting of the elastomeric material. The grouser bars 20 support the vehicle 10 on road surfaces and prevent contact of the track shoe with the road. In soft materials, such as agricultural soils, the grousers fully penetrate into the soil to provide traction for the vehicle 10 and allow the vehicle 10 to be supported by the track shoes 14.

As best shown in FIG. 4, each grouser bar 20 has a base portion 23 having a base surface 24, a tip portion 25 having a tip surface 26, which is spaced from and is substantially parallel to the base surface 24, a driving surface 28, and a trailing surface 30. The base, tip, driving, and trailing surfaces 24, 26, 28, 30 form a generally trapezoidal shape 32 in cross-section, with the base surface 24 being substantially larger than the tip surface 26. Grouser bar 20 has a height dimension "h", which is preferably in the range of about 1.0 to 2.75 inches. When the grouser bar 20 is new, or has little wear, height "h" is at or near the high end of the dimension range, which is about 2.75 inches. As the vehicle 10 is operated over a period of time, the grouser bars 20 can wear down due to continuous contact with soil, rock, and other earth type materials. As wear on the grouser bars 20 occurs, height "h" can gradually decrease until it approaches the low end of the dimension range, which is about 1.0 inch. Since the grouser bar 20 is in the shape of a trapezoid, with the base portion 23 being considerably larger than the tip portion 25, the area of the tip surface 26 gradually increases as the grouser bar 20 wears away. At the time when the grouser bar 20 has worn away to the point where dimension "h" is about 1.0 inch, the area "a" or "footprint" of the tip surface 26 is of a size which could make full penetration of the grouser bars 20 into hard soil 34 difficult. However, this is compensated for by the fact that the grouser needs to penetrate to a lesser depth. In most cases, full and complete penetration of the grouser bars 20 into the soil 34 provides the best traction, and the vehicle 10 is able to work more efficiently.

Full penetration of the grouser bars 20 into the soil 34 ensures that the ground contacting surface 19 of track shoes 14 will bear against the soil 34 and apply a compressive force to the soil 34. Such compression strengthens the soil 34 and results in greater traction and more efficient power transfer from the vehicle through the track assembly 12 to the soil 34. FIG. 6 illustrates the situation in which the grouser bars 20 are fully penetrated into the soil 34 and the track shoes 14 are in contact with and are applying a compressive force to the soil 34. With the vehicle 10 moving in a forward direction, illustrated by arrow 36, the driving surface 28 of each grouser bar 20 applies a tractive force against the soil 34. This force produces shear planes 38 which attempt to shear upward toward the surface of the soil 34. If the shear planes were successful in reaching the soil surface, the grouser bars 20 would lose traction, the track assembly 12 would have a tendency to slip, and tractive efficiency of the vehicle 10 would decrease. However, because of the downwardly applied compressive force of the track shoes 14 on the soil 34, and the specific spacing "D" between the grouser bars 20, the shear planes 38 do not break outwardly to the soil surface.

Because full penetration of the grouser bars 20 is directly related to tractive efficiency in agricultural soils, the maximum dimension of height "h" is important. In view of the trapezoidal shape of the grouser bar 20, as height "h" increases, the area "a" of the tip surface 26 decreases. When the height "h" exceeds about 2.75 inches, the tip portion 23 of the grouser bar 20 becomes too thin and will tend to deflect or bend rather than penetrate into the soil. Likewise, if the vehicle 10 is traveling on a hard road surface, the tip portion 23 would tend to deflect rather than support the vehicle 10.

The base surface 24 has a width "w" which is preferably in the range of 2.0 to 3.0 inches. Base surface 24 also has a length "$L_1$" which is essentially equal to the length "L" of the track shoes 14. On small track-type machines weighing about 18,000 to 24,000 lbs, length "$L_1$" would normally be 16 to 22 inches. On larger track-type machines weighing about 25,000 to 30,000 lbs, length "$L_1$" would normally be 24 to 26 inches. The surface area "$a_1$" provided by the appropriate width "w" and length "$L_1$" of the base surface 24 is preferably large enough to support the grouser bar 20 and prevent the tractive forces applied to the bar 20 from tearing the bar 20 from its mounting bar 27.

When the grouser bar 20 is new, or essentially unworn, the tip surface 26 has a width dimension "$w_1$", which is preferably in the range of 0.75 to 1.25 inches for smaller size machines and in the range of 1.25 to 1.50 for larger size machines. However, as the vehicle 10 is operated, the grouser bar 20 will wear away and height dimension "h" will decrease. As "h" decreases, width dimension "$w_1$" increases, due to the trapezoidal shape of the grouser bar 20. As previously stated, when "h" measures about 1.0 inch, the tip surface 26 is large enough to make full penetration of the grouser bar 20 difficult. At this point, the grouser bar 20 would normally be replaced with a new one. In view of the fact that the grouser bars 20 vary in size with the size of the vehicle 10, width "$w_1$" of a worn out grouser bar 20 will be different for different size vehicles 10.

Tip surface 26 also has a length "L$_2$", which is preferably in the range of about 16 to 24 inches, depending on the size of the vehicle 10. However, length "L$_2$", also increases slightly as the grouser bar 20 wears, in view of the tapered end walls 40. As is evident from FIGS. 3 and 5, length "L$_2$", of the tip surface 26 is less than length "L$_1$", of the base surface 24 because of the tapered end walls 40.

With particular reference to FIGS. 3, 4, and 5 of the drawings, the driving surface 28 is preferably approximately perpendicular to the base surface 24. However, as a practical matter, surface 28 has about a 5° slope away from normal in order to facilitate removal of the grouser bar 20 from a forming mold and to help reduce stresses. The trailing surface 30 of the grouser bar 20 slopes toward the base surface 24 preferably at an angle "A" of about 60°. Although the optimum dimension of angle "A" is 60°, angle "A" can vary between 50° and 70°. An angle of this size provides a sufficiently large mass of material at the base portion 23 of the grouser bar 20 to support the tip portion 25 and prevent overstressing and shearing of the material. Such an angle "A" further provides that the tip portion 25 is of a sufficiently smaller size to penetrate fully into most agricultural soils, while still providing sufficient surface area "a" on the tip surface 26 to fully support the vehicle on a hard surface, such as a finished road surface.

Each track shoe 14 of the track assembly 12 has a roadable grouser bar 20, which is secured to each shoe 14 at substantially the same location. The track shoes 14 have a predetermined spacing, or pitch "p", which provides that each of the grouser bars 20 is equally spaced a preselected distance "D" from the next adjacent grouser bar 20. Preferably, the ratio of the preselected height "h" of the grouser bar 20 to the distance "D" of the grouser bar spacing is in the range of 0.15 to 0.35. A ratio of less than 0.15 will result in a loss of traction because soil shear planes, produced when the grouser bars 20 are driving in the soil, will tend to break upward to the soil surface between the grouser bars 20 rather than between the tip portions 25. A ratio greater than 0.35 will provide less than full penetration due to an excessive number of grouser bars 20 with a corresponding loss of down pressure from the shoes 14. Down pressure exerted by the track shoe ground contacting surface 19 between the grousers adds to the shear strength of the soil for improved traction. Such a spacing of the shoes 14 and grouser bars 20 provides a sufficient number of grouser bars 20 to fully support the vehicle 10 on a hard road surface, and at the same time provide advantageous traction for the vehicle in soil when the grouser bars 20 are fully penetrated into the soil.

As the track assembly 12 is formed in an endless loop about the idler and sprocket, about one third of each track assembly 12 is in contact with the ground. This puts about ten to thirteen track shoes 14 and grousers 20 of each track assembly 12 in contact with the ground at any given time. When the vehicle 10 is totally supported on a hard surface by the tip surface 26 of the plurality of grouser bars 20 of a predetermined portion of the track assembly 12 which is in contact with the hard surface, the average ground pressure produced on the tip surface 26 by the predetermined weight of vehicle 10 is in the range of 40 to 100 pounds per square inch. A tip surface ground pressure of less than 40 pounds per square inch will generally not produce full penetration of the grouser bars 20 into the soil when the vehicle 10 is being used for agricultural purposes. A tip surface ground pressure of more than 100 pounds per square inch can cause possible damage to asphalt roads. Although the average tip surface ground pressure can be as high as 100 pounds per square inch, under most conditions, the average ground pressure would be in the range of 40 to 80 pounds per square inch.

Industrial Applicability

The subject roadable grouser bar 20 is particularly useful on endless track-type vehicles which are utilized in farming operations. Track-type vehicles offer several advantages over wheel-type vehicles in many agricultural operations. These advantages include higher drawbar pull, better traction, and lower total ground pressure force. It is important that the vehicle be able to work efficiently in many types of soil and weather conditions and not overly compact the soil which can cause less overall crop yields.

However, conventional track-type vehicles, which have metal track shoes and metal grouser bars, have one disadvantage when utilized for farming. This disadvantage involves the movement of the vehicle from one agricultural field to another, or from one location to another, if the vehicle must travel along or across established roads. Most rural farm areas are serviced by asphalt type roads and highways. Because farm vehicles having metal cleats or grouser bars have caused damage to such asphalt roads in the past, such vehicles are generally prohibited by law from traveling along or across the asphalt roads.

The subject roadable track assembly 12, utilizing elastomeric grouser bars 20, offers the advantages of track-type vehicles without the disadvantages, such as damage to asphalt roads. The roadable grouser bars 20 are of a specific size, shape, and material to provide excellent traction in soils for pulling or pushing various types of agricultural machinery. At the same time, the grouser bars 20 have sufficient resiliency to conform somewhat to roadway surfaces, and also has sufficient tip surface area to support the vehicle 10 on hard surfaced roadways without penetrating the roadway surface. A vehicle 10, equipped with the subject roadable track assembly 12 can be moved from one field to another, across or along asphalt type roads, without altering the vehicle 10, or without transporting the vehicle on a separate truck or trailer. This saves considerable time and effort for the vehicle operator or owner.

Other aspects, objects and advantages of this invention can be obtained from a study of the drawings, the disclosure, and the appended claims.

We claim:
1. An endless roadable track assembly (12) for a track-type vehicle (10), comprising:
 a plurality of track shoes (14), each shoe (14) having a length (L) and a ground contacting surface (19);
 a plurality of grouser bars (20) formed of elastomeric material, one of said grouser bars (20) secured to each of the ground contacting surfaces (19) of said shoes (14);
 each grouser bar (20) having a height (h), and a length (L$_1$) substantially equal to the length (L) of said shoe (14); and,
 each of said grouser bars (20) being equally spaced a predetermined distance (D) from the next adjacent grouser bar (20) with the ratio of said grouser bar height (h) to said preselected distance (D) being in the range of from 0.15 to 0.35.

2. The apparatus, as set forth in claim 1, wherein said height (h) of said grouser bar (20) is in the range of from 1.0 to 2.75 inches.

3. The apparatus, as set forth in claim 1, wherein said length ($L_1$) of said grouser bar (20) is in the range of from 16 to 26 inches.

4. The apparatus, as set forth in claim 1, wherein said vehicle (10) has a predetermined weight and a predetermined portion of the track assembly (12) is in contact with the ground at any given time, and said predetermined portion of the track assembly (12) provides a total tip surface area sufficient to produce an average ground pressure in the range of from 40 to 100 pounds per square inch when said vehicle (10) is totally supported by the grouser bars (20) of said predetermined portion of the track assembly (12) in contact with the ground.

5. The apparatus, as set forth in claim 1, wherein each of said grouser bars (20) has a base surface (24), a tip surface (26) spaced from and substantially parallel to said base surface (24), a driving surface (28), and a trailing surface (30), said surfaces forming a trapezoidal shape in cross-section, with said trailing surface (30) joining said base surface (24) at an angle in the range of from 50° to 70°.

6. The apparatus, as set forth in claim 5, wherein said tip surface (26) has a width ($w_1$) in the range of from 0.75 to 1.5 inches.

7. The apparatus, as set forth in claim 5, wherein said driving surface (28) joins said base surface (24) at an approximate right angle.

8. The apparatus, as set forth in claim 5, wherein said base surface has a width (w) which is in the range of from 2.0 to 3.0 inches.

9. The apparatus, as set forth in claim 5, wherein each of said grouser bars (20) has tapered end walls (40), and said tip surface (26) has a length ($L_2$) in the range of from 16 to 26 inches.

10. An endless roadable track assembly (12) for a work vehicle (10), comprising:
a plurality of articulately coupled track links (13) coupled together by a plurality of track pins (15) to form said endless track assembly (12);
a plurality of track shoes (14), one shoe (14) secured to each of said links (13), each shoe (14) having a length (L) and a ground contacting surface (19); and,
a plurality of grouser bars (20) formed of elastomeric material, said grouser bars (20) being secured respectively to the ground contacting surface (19) of said shoes (14), each grouser bar having a length ($L_1$) substantially equal to the length (L) of said shoe (14), a base surface (24), a tip surface (26), a driving surface (28), and a trailing surface (30), said surfaces (24,26,28,30) forming a trapezoidal shape in cross-section, said driving surface (28) joining said base surface (24) at an approximate right angle, and said trailing surface joining said base surface at an angle in the range of from 50° to 70°.

11. The apparatus, as set forth in claim 10, wherein said grouser bars (20) are formed of rubber.

12. The apparatus, as set forth in claim 10, wherein said grouser bars (20) are formed of urethane.

13. An endless roadable track assembly (12) for a work vehicle (10), said vehicle (10) having a predetermined weight and a predetermined portion of the track assembly (12) in contact with the ground at any given time, comprising:
a plurality of articulately coupled track links (13) coupled together by a plurality of track pins (15) to form said endless track assembly (12);
a plurality of track shoes (14), one shoe (14) secured to each of said links (13), each shoe (14) having a length (L) and a ground contacting surface (19);
a plurality of grouser bars (20) formed of elastomeric material, said grouser bars (20) secured to respective ground contacting surfaces (19) of said shoes (14), each grouser bar (20) having a length ($L_1$) substantially equal to the length (L) of said shoe (14), and a trapezoidal shape in cross section; and,
the average ground pressure applied by said vehicle weight being in the range of from 40 to 80 pounds per square inch when said vehicle (10) is totally supported by the grouser bars (20) of said predetermined portion of the track assembly (12) in contact with the ground.

* * * * *